(12) United States Patent
Yun et al.

(10) Patent No.: US 9,838,756 B2
(45) Date of Patent: *Dec. 5, 2017

(54) METHOD AND APPARATUS FOR PROVIDING THREE-DIMENSIONAL TERRITORIAL BROADCASTING BASED ON NON REAL TIME SERVICE

(71) Applicant: Electronics and Telecommunications Research Institute, Daejeon (KR)

(72) Inventors: Kug Jin Yun, Daejeon (KR); Jin Young Lee, Seoul (KR); Won Sik Cheong, Daejeon (KR); Gwang Soon Lee, Daejeon (KR); Nam Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 41 days.

This patent is subject to a terminal disclaimer.

(21) Appl. No.: 14/470,202

(22) Filed: Aug. 27, 2014

(65) Prior Publication Data

US 2015/0341706 A1  Nov. 26, 2015

(30) Foreign Application Priority Data

May 20, 2014 (KR) .................. 10-2014-0060453
Aug. 25, 2014 (KR) .................. 10-2014-0110935

(51) Int. Cl.
*H04N 21/81* (2011.01)
*H04N 21/435* (2011.01)
(Continued)

(52) U.S. Cl.
CPC ..... *H04N 21/8146* (2013.01); *H04N 13/0059* (2013.01); *H04N 21/2187* (2013.01); *H04N 21/435* (2013.01); *H04N 21/816* (2013.01)

(58) Field of Classification Search
CPC ............ H04N 21/2187; H04N 21/435; H04N 21/8146; H04N 13/0059; H04N 21/816
See application file for complete search history.

(56) References Cited

U.S. PATENT DOCUMENTS

| 2011/0157309 A1* | 6/2011 | Bennett | G06F 3/14 348/43 |
| 2011/0254920 A1* | 10/2011 | Yun | H04N 13/0048 348/43 |

(Continued)

OTHER PUBLICATIONS

European Telecommunications Standards Institute, DVB Specification for SI in DVB systems, Feb. 1998, ETSI, EN300 468 V1.3.1, p. all.*

(Continued)

*Primary Examiner* — Rong Le
(74) *Attorney, Agent, or Firm* — William Park & Associates Ltd.

(57) ABSTRACT

Provided is a method and apparatus for outputting an additional image independently of a reference image in a broadcasting receiver including a communicator to receive a stream of an additional image of a three-dimensional (3D) broadcast in non-real time, and receive a stream of a reference image of the 3D broadcast in real-time and a processor to generate a 3D image of the 3D broadcast based on the stream of the additional image and the stream of the reference image.

18 Claims, 12 Drawing Sheets

(51) Int. Cl.
*H04N 21/2187* (2011.01)
*H04N 13/00* (2006.01)

(56) References Cited

U.S. PATENT DOCUMENTS

2013/0276046 A1  10/2013  Park
2014/0160238 A1   6/2014  Yim et al.

OTHER PUBLICATIONS

Kwon, Yun, Cheong, Hur, Program Associated 3D non-real-time service on terrestrial DTV, Feb. 2012, IEEE, vol. 58, No. 1, pp. 1-5.*
Hyoungjin Kwon et al., Program Associated 3D Non-Real-Time Service on Terrestrial DTV, IEEE Transactions on Consumer Electronics, Feb. 2012, pp. 132-136, vol. 58, No. 1.

* cited by examiner

METHOD AND APPARATUS FOR PROVIDING THREE-DIMENSIONAL TERRITORIAL BROADCASTING BASED ON NON REAL TIME SERVICE

TECHNICAL FIELD

The present invention relates to technology for providing a three-dimensional (3D) broadcast and, more particularly, to a method and apparatus for providing a 3D broadcast based on a non-real-time service.

BACKGROUND ART

A distance from an object may be recognized through a binocular parallax. Based on a principle of stereoscopic recognition using an optic angle, a three-dimensional (3D) image may provide a cubic effect to both eyes of a user.

The 3D image may be provided using a plurality of two-dimensional (2D) images. For example, the 3D image may be generated using a 2D image corresponding to a left eye of the user and a 2D image corresponding to a right eye of the user.

A current broadcasting environment may be appropriate for transmitting the 2D image. The 2D image used in the current broadcasting environment may be a reference image of the 3D image. By adding an additional image to the reference image, the 3D image may be provided to the user.

DISCLOSURE OF INVENTION

Technical Goals

An aspect of the present invention provides a method and apparatus for transmitting a three-dimensional (3D) image based on a non-real-time service.

Another aspect of the present invention also provides a method and apparatus for receiving a 3D image.

Technical Solutions

According to an aspect of the present invention, there is provided a broadcasting receiver including a communicator to receive a stream of an additional image of a three-dimensional (3D) broadcast in non-real time, and receive a stream of a reference image of the 3D broadcast in real-time, and a processor to generate a 3D image of the 3D broadcast based on the stream of the additional image and the stream of the reference image, wherein the additional image is allowed to be output independently of the reference image.

The communicator may receive the stream of the additional image in advance of receiving the stream of the reference image.

A different terrestrial channel may be assigned to each of the stream of the additional image and the stream of the reference image such that the additional image is allowed to be output independently of the reference image.

Whether the additional image is allowed to be output independently of the reference image may be indicated in a capabilities_descriptor included in the stream of the additional image.

The broadcasting receiver may further include a storage to store the stream of the additional image.

The stream of the reference image may include metadata for generating the 3D image.

The metadata may include synchronization information for synchronizing the reference image and the additional image.

The processor may acquire information on contents provided in non-real-time by parsing a stream of the real-time broadcasting, and the communicator may request the stream of the additional image based on the information.

The information may be included in the stream of the real-time broadcasting.

According to another aspect of the present invention, there is also provided a broadcasting server including a communicator to transmit a stream of an additional image of a 3D broadcast to a receiver in non-real-time, and transmit a stream of a reference image of the 3D broadcast to the receiver in real-time, and a processor to assign a different terrestrial channel to each of the stream of the additional image and the stream of the reference image, wherein, in response to the assigning, the additional image is allowed to be output independently of the reference image from the receiver.

The communicator may transmit the stream of the additional image in advance of transmitting the stream of the reference image.

Whether the additional image is allowed to be output independently of the reference image may be indicated in a capabilities_descriptor included in the stream of the additional image.

The stream of the reference image may include metadata for generating the 3D image.

The metadata may include information for synchronizing the reference image and the additional image.

The communicator may transmit information on contents provided in non-real-time, to the receiver based on a stream of the real-time broadcasting, and receive a request for the stream of the additional image based on the information, from the receiver.

The information may be included in the stream of the real-time broadcasting.

The processor may perform signaling on each of the stream of the additional image and the stream of the reference image based on a program map table (PMT) to assign the different terrestrial channel to each of the stream of the additional image and the stream of the reference image.

The processor may assign two terrestrial channels to the stream of the reference image, and the terrestrial channels may be a terrestrial channel applying the reference image to a two-dimensional (2D) broadcast and a terrestrial channel applying the reference image to the 3D broadcast.

The processor may perform signaling on the stream of the reference image based on a PMT corresponding to each of the terrestrial channels to assign the terrestrial channels to the stream of the reference image.

According to still another aspect of the present invention, there is also provided a broadcasting reception method including receiving a stream of an additional image of a 3D broadcast in non-real-time, receiving a stream of a reference image of the 3D broadcast in real-time, and generating a 3D image of the 3D broadcast using the stream of the additional image and the stream of the reference image, wherein the additional image is allowed to be output independently of the reference image.

Advantageous Effects

According to an aspect of the present invention, it is possible to provide a broadcasting reception method and a broadcasting receiver for an additional image in non-realtime, receiving a reference image, and providing an additional image to a user independently.

BEST MODE FOR CARRYING OUT THE INVENTION

Figure 1:
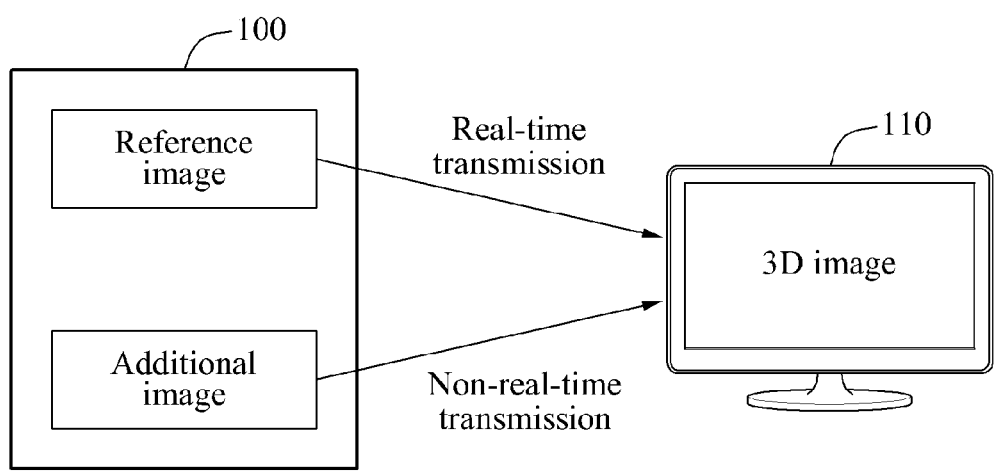
FIG. 1 is a diagram illustrating a broadcasting system for providing a three-dimensional (3D) image according to an example embodiment.

Hereinafter, exemplary embodiments will be described in detail with reference to the accompanying drawings, wherein like reference numerals refer to like elements throughout.

Various alterations and modifications may be made to the exemplary embodiments, some of which will be illustrated in detail in the drawings and detailed description. However, it should be understood that these embodiments are not construed as limited to the illustrated forms and include all changes, equivalents or alternatives within the idea and the technical scope of this disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Like reference numerals in the drawings denote like elements, and redundant descriptions of like elements will be omitted herein. When it is determined a detailed description of a related known function or configuration they may make the purpose of the present invention unnecessarily ambiguous in describing the present invention, the detailed description will be omitted herein.

FIG. 1 is a diagram illustrating a broadcasting system for providing a three-dimensional (3D) image according to an example embodiment.

A 3D broadcast program may include a 3D image, an audio, and ancillary data. Hereinafter, the 3D broadcast program may also be referred to as a 3D broadcast. The 3D image may include a left image and a right image.

The 3D image may be provided based on a reference image, for example, a base view video, and an additional image, for example, an additional view video. The reference image may be a two-dimensional (2D) image. The additional image may be an image added to the reference image for provision of the 3D image. A viewpoint of the additional image may differ from a viewpoint of the reference image.

For example, the reference image may be the left image, and the additional image may be the right image. The left image may be an image for a left eye of an audience. The right image may be an image for a right eye of the audience.

When the 3D image is configured by compressing a plurality of images, at least one of the plurality of images may be a broadcasting service corresponding to the 2D image having a resolution identical to a product resolution. The plurality of images may include the reference image and the additional image.

A broadcasting server 100 may transmit the reference image and the additional image to a broadcasting receiver 110. For example, the broadcasting server 100 may convert each of the reference image and the additional image into a transport stream (TS) and transmit a result of the converting to the broadcasting receiver 110. Hereinafter, the TS may also be referred to as a stream.

In an example, the broadcasting server 100 may transmit the additional image in non-real-time. For example, the broadcasting server 100 may transmit the additional image in non-real-time based on an advanced television system committee (ATSC) non-real-time (NRT) service.

The broadcasting server 100 may transmit the reference image in real-time. For example, the broadcasting server 100 may transmit the reference image in real time based on an ATSC terrestrial service.

The ancillary data may include subscription data on the 3D broadcast. The ancillary data may also include channel signaling section data. The ancillary data may be multiplexed with the reference image and incorporated in a stream of the reference image.

In an example, the additional image transmitted to the broadcasting receiver 110 may be used to generate the 3D image.

In another example, the additional image transmitted to the broadcasting receiver 110 may be output from the broadcasting receiver 110 independently of the reference image. For example, when the broadcasting server 100 assigns a channel to the additional image, the additional image may be output from the broadcasting receiver 110 as an independent image of the reference image.

Hereinafter, descriptions about a method of independently outputting the additional image will be provided with reference to FIGS. 2 through 12.

Figure 2:
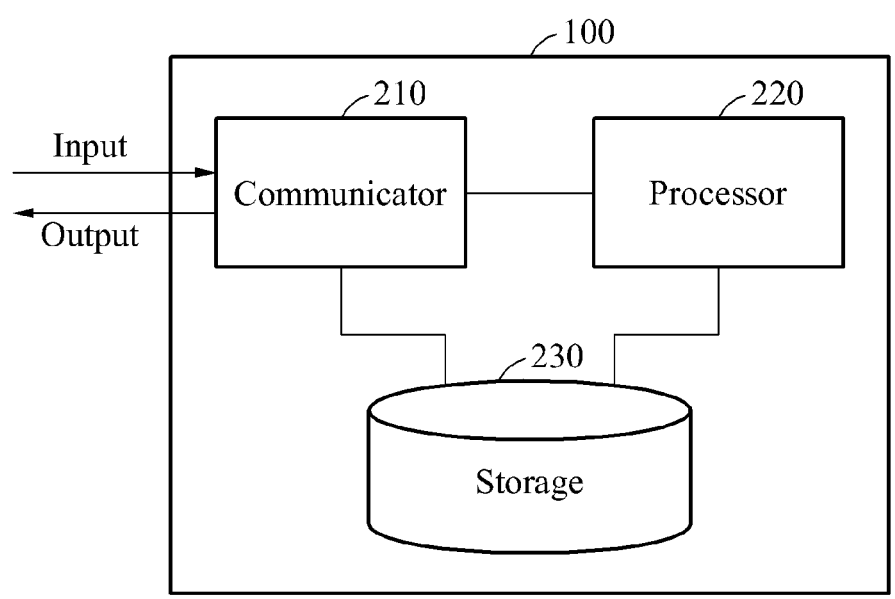
FIG. 2 is a diagram illustrating a configuration of a broadcasting server according to an example embodiment.

FIG. 2 is a diagram illustrating a configuration of a broadcasting server according to an example embodiment.

The broadcasting server 100 may include a communicator 210, a processor 220, and a storage 230.

The communicator 210 may be connected to a different server, a terminal, and the like.

The processor 220 may process information received by the communicator 210 and information stored in the storage 230.

The storage 230 may store the information received by the communicator 210 and information processed by the processor 220.

Descriptions about the communicator 210, the processor 220, and the storage 230 will also be provided with reference to FIGS. 4 through 8.

Repeated descriptions with respect to FIG. 2 will be omitted for increased clarity and conciseness because the descriptions provided with reference to FIG. 1 are also applicable to FIG. 2.

Figure 3:
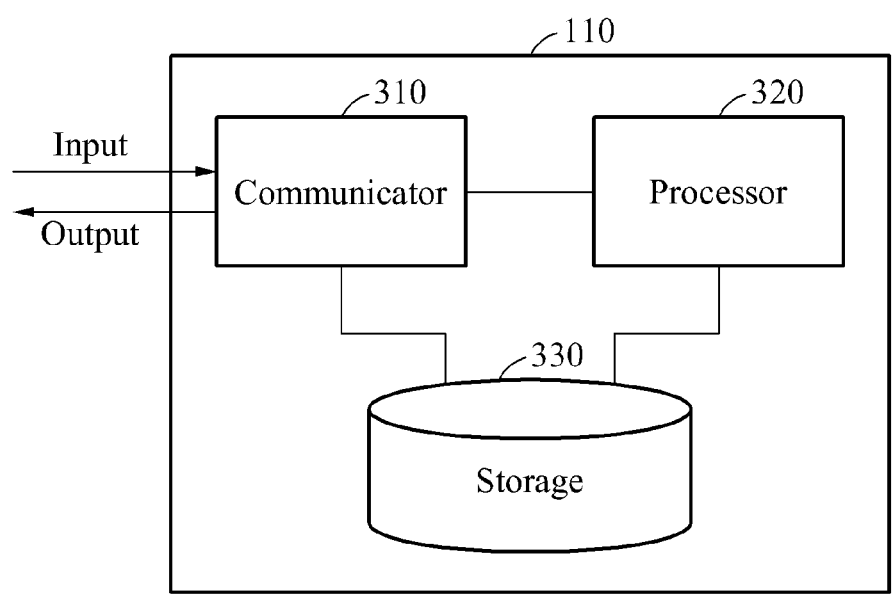
FIG. 3 is a diagram illustrating a configuration of a broadcasting receiver according to an example embodiment.

FIG. 3 is a diagram illustrating a configuration of a broadcasting receiver according to an example embodiment.

The broadcasting receiver 110 may include a communicator 310, a processor 320, and a storage 330.

The communicator 310 may be connected to a server, a terminal, and the like.

The processor 320 may process information received by the communicator 310 and information stored in the storage 330.

The storage 330 may store the information received by the communicator 310 and information processed by the processor 320.

Descriptions about the communicator 310, the processor 320, and the storage 330 will also be provided with reference to FIGS. 4 through 12.

Repeated descriptions with respect to FIG. 3 will be omitted for increased clarity and conciseness because the descriptions provided with reference to FIG. 1 are also applicable to FIG. 3.

Figure 4:
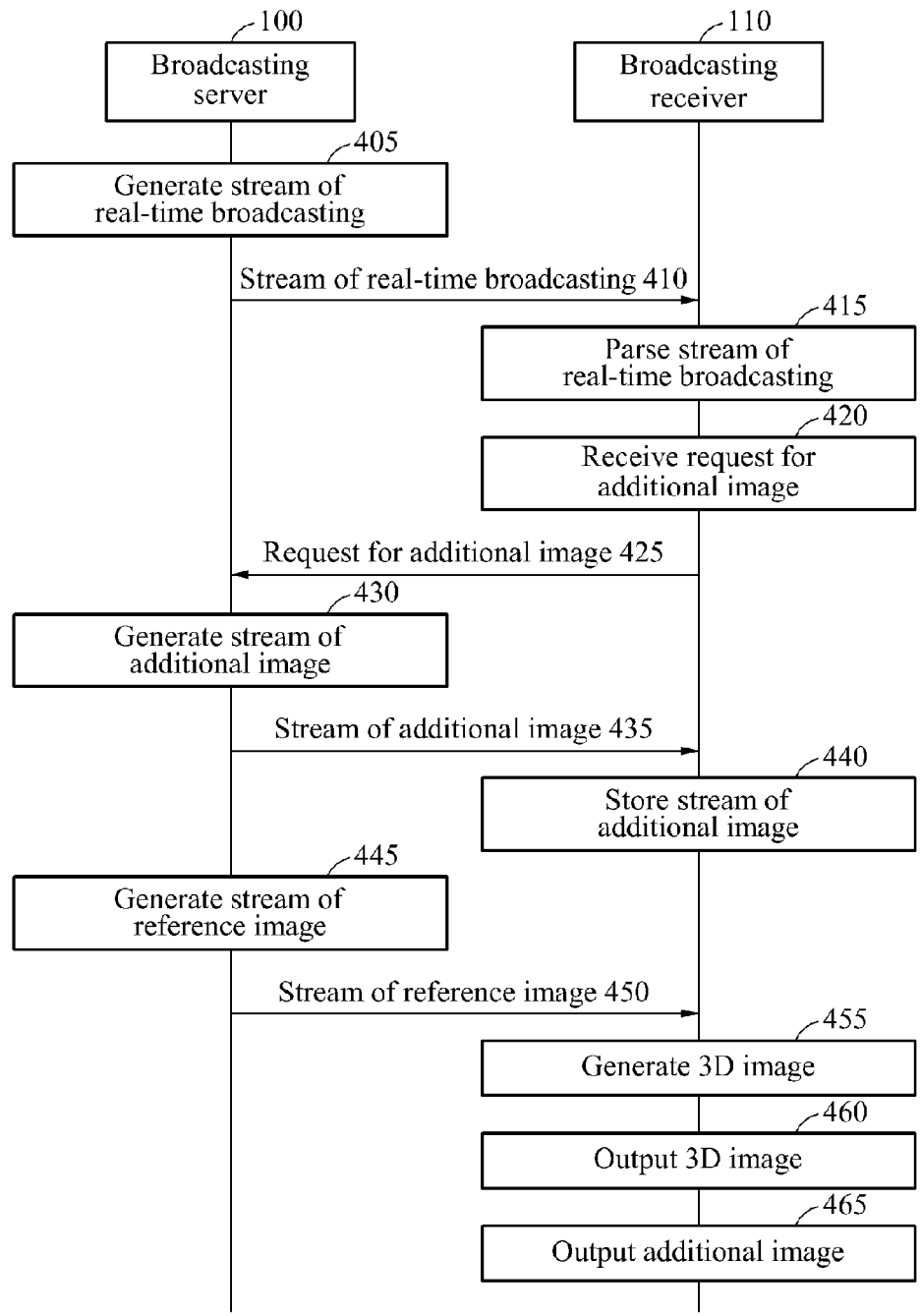
FIG. 4 is a diagram illustrating a signal flow of a broadcasting provision method according to an example embodiment.

FIG. 4 is a diagram illustrating a signal flow of a broadcasting provision method according to an example embodiment.

In operation 405, the processor 220 may generate a stream of a real-time broadcasting and a live broadcasting. The real-time broadcasting may be a broadcasting based on a broadcasting schedule of a broadcasting station operating the broadcasting server 100.

The stream of the real-time broadcasting may include information on an NRT service. Whether a predetermined broadcast is a 3D broadcast may be indicated in the information on the NRT service. The predetermined broadcast may be a broadcast transmitted to the broadcasting receiver 110 in real-time. For example, a stream type of the information on the NRT service may be 0x0D, a DSMCC-addressable section, established in an ATSC non-real-time content delivery (A/103:2012) standard.

In operation 410, the communicator 210 may transmit the stream of the real-time broadcasting to the broadcasting receiver 110. For example, the stream of the real-time broadcasting may be transmitted based on an ATSC terrestrial service.

The communicator 310 may receive the stream of the real-time broadcasting from the broadcasting server 100.

In operation 415, the processor 320 may parse the stream of the real-time broadcasting.

The stream of the real-time broadcasting may include information on contents provided in non-real-time.

The processor 320 may acquire the information on the contents provided in non-real-time by parsing the stream of the real-time broadcasting. For example, the processor 320 may provide the information on the NRT service to an audience or a user of the broadcasting receiver 110 by parsing the stream of the real-time broadcasting.

In operation 420, the communicator 420 may receive a request for an additional image of a predetermined broadcast from the user. For example, the predetermined broadcast may be the 3D broadcast.

In operation 425, the communicator 310 may transmit the request for the stream of the additional image to the broadcasting server 100 based on the information on the contents provided in non-real-time. For example, a request for the additional image may be transmitted based on an ATSC NRT service.

The communicator 210 may receive the request for the additional image from the broadcasting receiver 110.

In operation 430, the processor 220 may generate the stream of the additional image.

Although FIG. 4 illustrates operation 430 to be performed subsequent to operation 425, operation 430 may be performed in advance of performing operation 425. For example, the processor 220 may generate the stream of the additional image in advance. The storage 230 may store the generated stream of the additional image.

Figure 5:
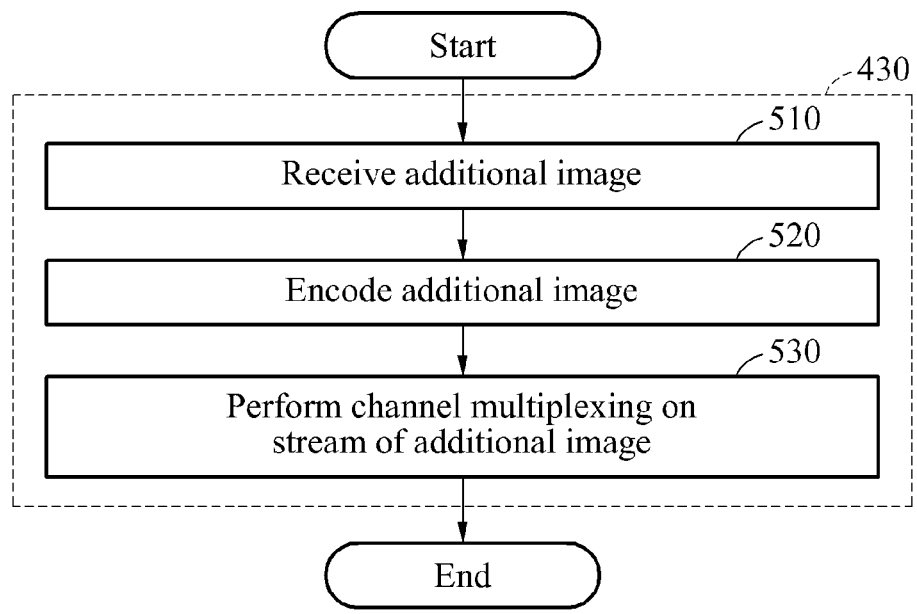
FIG. 5 is a flowchart illustrating a method of generating a stream of an additional image according to an example embodiment.

Descriptions about a method of generating the stream of the additional image will be provided with reference to FIG. 5.

In operation 435, the communicator 210 may transmit the stream of the additional image to the broadcasting receiver 110. For example, the communicator 210 may transmit the stream of the additional image to the broadcasting receiver 110 in non-real-time.

The communicator 310 may receive the stream of the additional image from the broadcasting server 100 in non-real-time.

The communicator 310 may receive the stream of the additional image in advance of receiving a stream of a reference image.

The processor 320 may store the stream of the additional image in the storage 330.

In operation 445, the processor 220 may generate a stream of a reference image of a predetermined broadcast.

Operation 445 may be performed on the predetermined broadcast based on a schedule of a broadcasting station.

Figure 6:
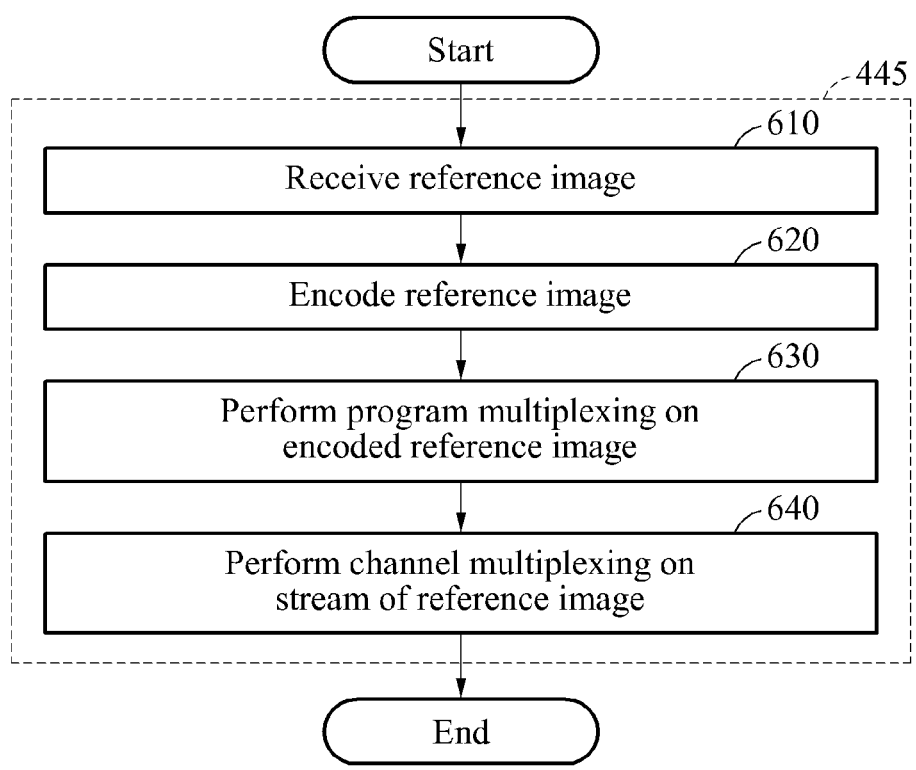
FIG. 6 is a flowchart illustrating a method of generating a stream of a reference image according to an example embodiment.

Descriptions about a method of generating the stream of the reference image will be provided with reference to FIG. 6.

In operation 450, the communicator 210 may transmit the stream of the reference image to the broadcasting receiver 110 in real-time. For example, the stream of the reference image may be transmitted based on the ATSC terrestrial service.

The communicator 310 may receive the stream of the reference image from the broadcasting server 100 in real-time.

In operation 455, the processor 320 may generate a 3D image based on the stream of the additional image and the stream of the reference image.

In operation 460, the processor 320 may output the 3D image to the user.

In operation 465, the processor 320 may output the additional image to the user. The additional image may be output independently of the reference image. Concisely, the additional image may also be output irrespective of the reference image when the reference image is not received.

For example, when the additional image is a right image of the 3D image, the processor 320 may output only the right image to the user.

Repeated descriptions with respect to FIG. 4 will be omitted for increased clarity and conciseness because the descriptions provided with reference to FIGS. 1 through 3 are also applicable to FIG. 4.

FIG. 5 is a flowchart illustrating a method of generating a stream of an additional image according to an example embodiment.

Operation 430 may include operations 510 through 530 described below.

In operation 510, the communicator 210 may receive an additional image. As an example, the communicator 210 may receive the additional image from the storage 230. As another example, the communicator 210 may receive the additional image from another server providing the additional image.

In operation 520, the processor 220 may encode the additional image. The encoding of the additional image may be performed by compressing the additional image.

For example, the processor 220 may encode the additional image and generate a moving picture experts group (MPEG)-2 stream. The MPEG-2 stream may comply with the Information technology—Generic coding of moving pictures and associated audio information: System (ISO/IEC 13818-1:2013) standard.

An encoding form of the encoded additional image may be one of forms shown in Table 1.

TABLE 1

| Number of scanning lines | Number of pixels | Display aspect ratio | Display refresh rate (Hz) |
| --- | --- | --- | --- |
| 1080 | 1920 | 16:9 | 60I, 30P, 24P |
| 720 | 1280 | 16:9 | 60P, 30P, 24P |

In the display refresh rate of Table 1, P denotes a progressive scanning, and I denotes an interlace scanning.

The stream type of the additional image may comply with the standard of transmission and reception for terrestrial 3D television (TV) broadcasting—Part I: Existing channel (TTAK.KO-07.0100/R1).

An encoding scheme and a decoding scheme described below may comply with the standard of transmission and reception for terrestrial 3DTV broadcasting—Part I: Existing channel (TTAK.KO-07.0100/R1).

In operation 530, the processor 220 may perform channel multiplexing on the stream of the additional image. For example, the processor 220 may perform the channel multiplexing on the stream of the additional image by signaling the stream of the additional image. The channel multiplexing may indicate assigning a channel number to the stream of the additional image.

Contents on program specific information (PSI) may comply with the standard of transmission and reception for terrestrial 3DTV broadcasting (TTAK.KO-07.0014/R3).

Contents on the signaling of the stream of the additional image may comply with the standard of ATSC non-real-time content delivery (A/103:2012).

The signaling of the stream of the additional image for the NRT service may be performed using a service signaling channel (SSC). A service map table (SMT) of information transferred to the SST may provide information on the NRT service. An NRT-information table (IT) of the information transferred to the SSC may provide information on a contents item included in the NRT service. The SMT and the NRT-IT may comply with the standard of SSC (Doc.A/103: 2012).

The additional image may be an image for use in the 3D broadcast or an image playback based on a separate 2D broadcast.

For example, when the processor 220 assigns a different terrestrial channel to each of the stream of the additional image and the stream of the reference image, the additional image may be output from the broadcasting receiver 110 independently of the reference image.

The processor 220 may perform signaling on the stream of the additional image and the stream of the reference image based on a program map table (PMT) to assign the different terrestrial channel to each of the stream of the additional image and the stream of the reference image.

Figure 7:
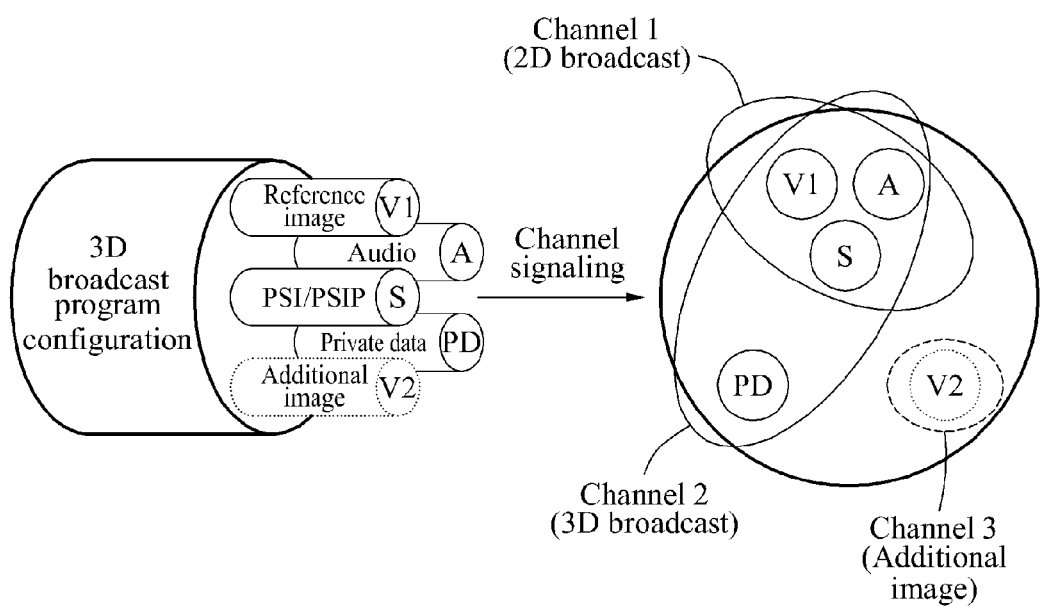
FIG. 7 is a diagram illustrating a method of assigning a different terrestrial channel to each of a stream of an additional image and a stream of a reference image according to an example embodiment.

Descriptions about a method of signaling based on the PMT will be provided with reference to FIG. 7.

A capabilities_descriptor may be used to determine whether the additional image is an image for use in the 3D broadcast or an image playback based on the 2D broadcast. For example, whether the additional image is allowed to be output independently of the reference image may be indicated in the capabilities_descriptor included in the stream of the additional image.

The capabilities_descriptor may comply with the standard of ATSC non-real-time content delivery (Doc.A/103: 2012).

Capability_codes included in the capabilities_descriptor may be extended as shown in Table 2.

TABLE 2

| Capability_code | Contents |
| --- | --- |
| 0x52 | Additional image of compatible 3D image (disallowed to be used as independent 2D image) |
| 0x53 | Additional image of compatible 3D image (allowed to be used as independent 2D image) |

Descriptions about a method of using the additional image as an independent 2D image will be provided with reference to FIG. 7.

Repeated descriptions with respect to FIG. 5 will be omitted for increased clarity and conciseness because the descriptions provided with reference to FIGS. 1 through 4 are also applicable to FIG. 5.

FIG. 6 is a flowchart illustrating a method of generating a stream of a reference image according to an example embodiment.

Operation 445 may include operations 610 through 640 described below.

In operation 610, the communicator 210 may receive a reference image. As an example, the communicator 210 may receive the reference image from the storage 230. As another example, the communicator 210 may receive the reference image from another server providing the reference image.

In operation 620, the processor 220 may encode the reference image. The encoding of the reference image may indicate performing a compression on the reference image. The encoding of the reference image may comply with the standard of transmission and reception for terrestrial 3DTV broadcasting—Part I: Existing channel (TTAK.KO-07.0100/R1).

An encoding form of the encoded reference image may be one of forms shown in Table 3.

TABLE 3

| Number of scanning lines | Number of pixels | Display aspect ratio | Display refresh rate (Hz) |
|---|---|---|---|
| 1080 | 1920 | 16:9 | 60I, 30P, 24P |
| 720 | 1280 | 16:9 | 60P, 30P, 24P |

In a process of encoding the reference image, the processor 220 may encode the reference image based on ancillary data. For example, the ancillary data may be closed captioning data.

The form of the encoded reference image may be an elementary stream (ES) In operation 630, the processor 220 may perform a program multiplexing on the encoded reference image.

The processor 220 may perform the program multiplexing based on metadata for the encoded reference image, an encoded audio signal, and the additional image.

In an example, a stream of reference image generated by performing the program multiplexing may include metadata for generating the 3D image.

The metadata may include program specific information (PSI).

The PSI may include at least one of a program association table (PAT) for maintaining a program data list, a conditional access table (CAT) including access control information such as a scrambling, a PMT including information on an audio stream and an image stream in a program, a network information table (NIT) including information on a network being used for transmitting MPEG information.

The PMT may provide information on each program included in a stream and a program_number. The PMT may list ESs configuring an MPEG-2 program. The PMT may provide location information for an optional descriptor describing a complete MPEG-2 stream and an optional descriptor for each of the ESs. Each of the ESs may be identified based on a stream_type value.

In an example, the processor 220 may perform the program multiplexing based on at least one PMT.

A broadcast provided based on the reference image may be the 2D broadcast or the 3D broadcast. The processor 220 may indicate whether the broadcast is the 2D broadcast or the 3D broadcast based on each PMT.

As an example, the processor 220 may assign two terrestrial channels to the stream of the reference image. The terrestrial channels may be a terrestrial channel for using the reference image to the 2D broadcast and a channel using the reference channel to the 3D broadcast. The processor 220 may perform signaling on the stream of the reference image based on a PMT corresponding to each of the terrestrial channels to assign the terrestrial channels to the stream of the reference image.

As an example, the processor 220 may assign a code indicating that the 2D broadcast is being provided, to a first PMT. A 2D broadcast code may be program_number=0x001. The first PMT may be associated with the reference image and an audio signal.

The processor 220 may assign a code indicating that the 3D broadcast is being provided, to a second PMT. A 3D broadcast code may be program_number=0x002. The second PMT may be associated with metadata for the additional image and information on an NRT service used for transferring the additional image, the audio signal, and the reference image.

In an example, the processor 220 may generate an MPEG-2 stream by performing the program multiplexing on the reference image. The MPEG-2 stream may comply with the standard of Information technology—Generic coding of moving pictures and associated audio information: System (ISO/IEC 13818-1:2013).

The metadata may include synchronization information for synchronizing the reference image and the additional image.

The synchronization information may be described in a media_pairing_information( ). The synchronization information may comply with the standard of transmission and reception for terrestrial 3DTV broadcasting—Part III: Hybrid (TTAK.KO-07.0122).

The program multiplexing may comply with the standard of transmission and reception for terrestrial 3DTV broadcasting (TTAK.KO-07.0014/R3) and ISO/IEC 13818-1: 2013.

The stream type of the metadata may comply with the standard of transmission and reception for terrestrial 3DTV broadcasting—Part I: Existing channel (TTAK.KO-07.0100/R1).

The stream type of the metadata may be 0x06, for example, private data, established in ISO/IEC 13818-1: 2013.

The stream type of the information on the NRT service may adopt 0x0D, for example, a DSMCC-addressable section, established in the standard of ATSC non-real-time content delivery (A/103:2012).

The PMT may include a stereoscopic program information descriptor, for example, stereoscopic_program_info_descriptor( ), and a stereoscopic video information descriptor, for example, stereoscopic_video_info_descriptor( ).

Stereo scopic_program_info_descriptor( ) and stereoscopic_video_info_descriptor( ) may comply with the standard of transmission and reception for terrestrial 3DTV broadcasting—Part I: Existing channel (TTAK.KO-070.0100/R1).

In operation 640, the processor 220 may perform a channel multiplexing on the stream of the reference image. The channel multiplexing may indicate assigning a channel number to the stream of the reference image.

For example, the processor 220 may perform the channel multiplexing on the stream of the reference image by signaling the stream of the reference image.

Contents on the PSI may comply with the standard of transmission and reception for terrestrial 3DTV broadcasting (TTAK.KO-07.0014/R3).

In an example, the processor 220 may perform the channel multiplexing on the stream of the reference image based on at least one PMT. Descriptions about the channel multiplexing will also be provided with reference to FIG. 7.

Repeated descriptions with respect to FIG. 6 will be omitted for increased clarity and conciseness because the descriptions provided with reference to FIGS. 1 through 5 are also applicable to FIG. 6.

FIG. 7 is a diagram illustrating a method of assigning a different terrestrial channel to each of a stream of an additional image and a stream of a reference image according to an example embodiment.

A 3D broadcast may include a reference image, an audio, PSI/PSIP, private data, and an additional image.

The processor 220 may assign a plurality of terrestrial channels to a stream of the reference image based on whether a broadcasting based on the reference image is a 2D broadcast or the 3D broadcast. For example, the processor 220 may assign a channel 1 to a broadcasting based on a first PMT. The processor 220 may assign a channel 2 to a broadcasting based on a second PMT.

The processor 220 may assign a different terrestrial channel to a stream of the additional image when compared to the stream of the reference image such that the additional image is allowed to be output from the broadcasting receiver 110 independent of the reference image. For example, when a third PMT is associated with the stream of the additional image, the processor 220 may assign a channel 3, to a broadcasting based on the third PMT.

The channel may be a virtual channel.

The processor 220 may apply a previously serviced channel signaling to the 2D broadcast, and assign a channel number different from that of the 2D broadcast to the 3D broadcast based on a terrestrial virtual channel table (TVCT).

The processor 220 may assign a channel number different from other channel numbers with respect to the stream of the additional image by using the TVCT.

The processor 220 may perform signaling on a program identifier (PID) value of an ES configuring a hybrid 3DTV broadcasting based on a service_location_descriptor.

An ATSC NRT service-based channel may be identified based on a service_type 0x09, for example, an extended parameterized service.

The processor 220 may perform signaling to determine whether the 3D broadcast is verified and a type of the 3D broadcast based on a parameterzied_service_descriptor (PSD).

A channel for transmitting the stream of the additional image may use a service_type, for example, an ATSC NRT Service.

The PSD may be included in the TVCT corresponding to a service_type 0x09.

The PSD may provide an explanation about a broadcasting service.

The processor 220 may perform signaling to determine whether a corresponding broadcasting service is supported in the broadcasting receiver 110 based on the PSD.

Descriptions about the PSD will be provided with reference to Table 4.

TABLE 4

| Syntax | Number of bits | Form |
|---|---|---|
| parameterized_service_descriptor( ){ | | |
| descriptor_tag | 8 | uimsbf |
| descriptor_length | 8 | uimsbf |
| application_tag | 8 | bslbf |
| application_data( ) | var | |
| } | | |

In table 4, application_tag may indicate a subsequent application_data( ). In a case of the 3D broadcast, a value of the application_tag may be 0x01.

Also, a syntax of the application_data( ) may be defined based on the value of the application_tag. When the value of the application_tag is "0x01", the syntax of the application_data( ) may be expressed as shown in Table 5.

TABLE 5

| Syntax | Number of bits | Form |
|---|---|---|
| application_data(0x01){ | | |
| reserved | 3 | uimsbf |
| 3D_channel_type | 5 | uimsbf |
| for (i=0; i<N; i++){ | | |

TABLE 5-continued

| Syntax | Number of bits | Form |
|---|---|---|
| reserved | 8 | bslbf |
| } | | |
| } | | |

In Table 5, 3D_channel_type may indicate type information on the 3D broadcast. An ATSC NRT-based 3D broadcast may be set as 0x05.

Descriptions about a value of the 3D_channel_type will be provided with reference to Table 6.

TABLE 6

| Value | Indication |
|---|---|
| 0x00-0x03 | Reserved |
| 0x04 | Internet protocol (IP) hybrid 3DTV service |
| 0x05 | ATSC NRT-based terrestrial 3DTV service |
| 0x06-0x1F | ATSC reserved |

To provide guide information on the ATSC NRT-based 3D broadcast, stereoscopic_program_info_descriptor( ) may be added to an event information table (EIT) of a program and system information protocol (PSIP). Stereoscopic_program_info_descriptor( ) may be disposed to a descriptor loop describing an event of the EIT.

Repeated descriptions with respect to FIG. 7 will be omitted for increased clarity and conciseness because the descriptions provided with reference to FIGS. 1 through 6 are also applicable to FIG. 7.

Figure 8:
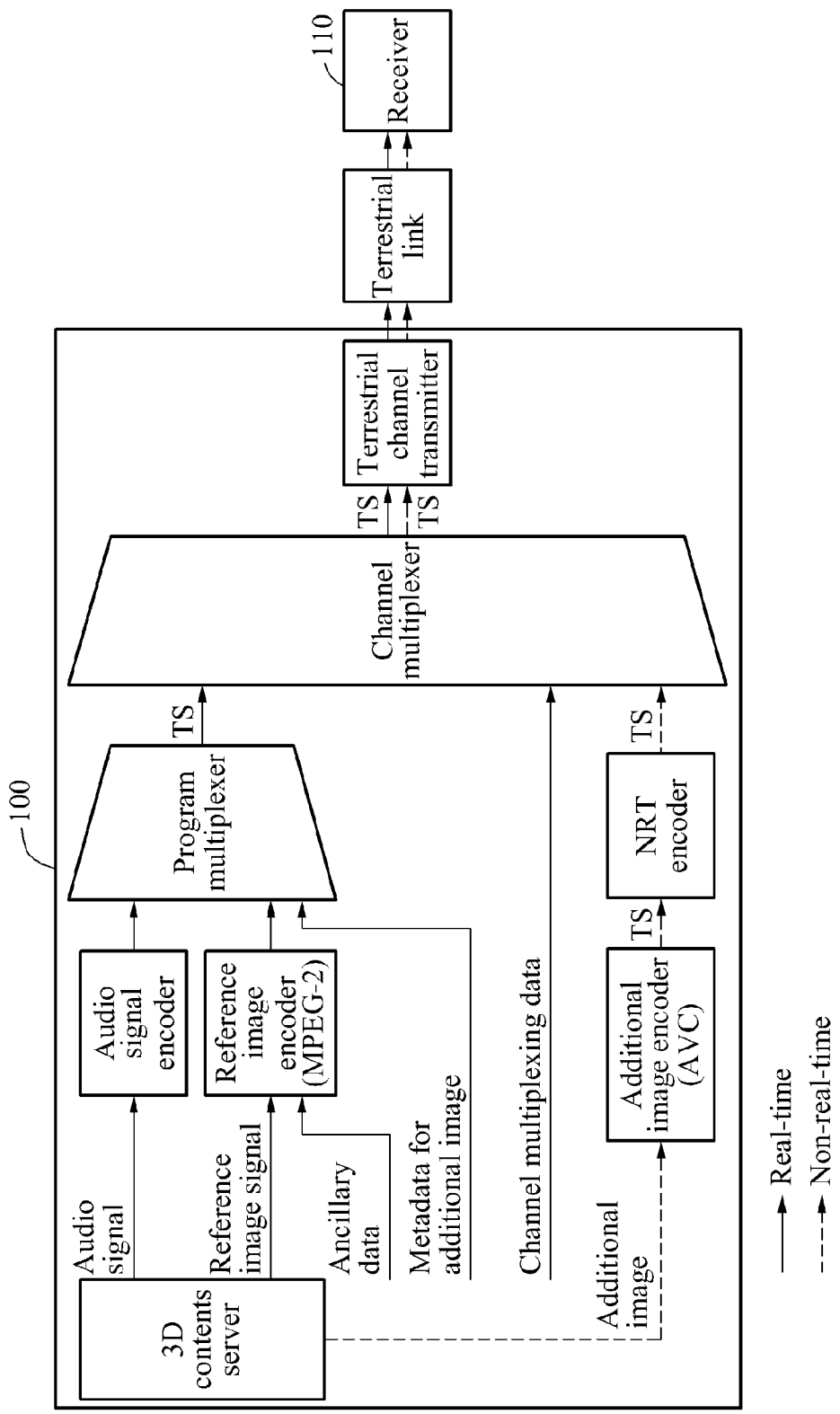
FIG. 8 is a diagram illustrating a configuration of a broadcasting server according to an example embodiment.
Figure 9:
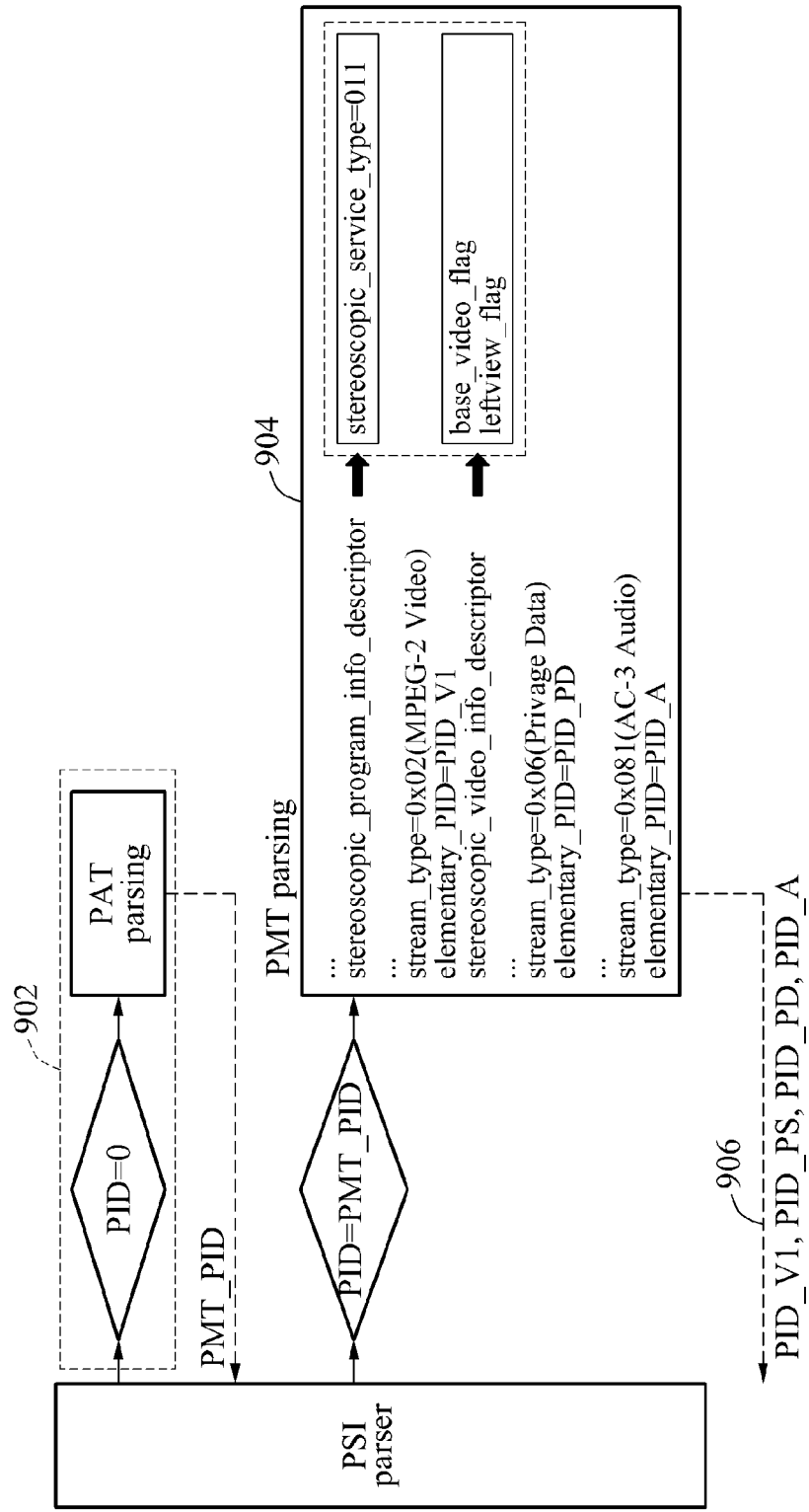
FIGS. 9 through 12 are flowcharts illustrating a 3D image generation method of a broadcasting receiver according to an example embodiment.

FIG. 8 is a diagram illustrating a configuration of a broadcasting server according to an example embodiment.

The broadcasting server 100 may include a 3D contents server, an audio signal encoder, a reference image encoder, a program multiplexer, an additional image encoder, an NRT encoder, a channel multiplexer, and a terrestrial channel transmitter.

The storage 230 may include the 3D contents server.

The processor 220 may include the audio signal encoder, the reference image encoder, the program multiplexer, the additional image encoder, the NRT encoder, and the channel multiplexer.

The communicator 210 may include the terrestrial channel transmitter.

The 3D contents server may store a reference image, an additional image, and an audio signal.

The audio signal encoder may encode an audio signal.

The reference image encoder may encode the reference image. The reference image encoder may perform operation 620 described above.

The program multiplexer may perform a program multiplexing based on the reference image, an audio signal, and metadata. The program multiplexer may perform operation 630 described above.

The channel multiplexer may perform a channel multiplexing on a reference signal stream and an additional signal stream. The channel multiplexer may perform operation 640 described above.

The additional image encoder may encode the additional image. The additional image encoder may perform operation 520 described above.

The NRT encoder may encode a stream of the additional image to correspond to an NRT service. The NRT encoder may perform operation 520 as described above.

The terrestrial channel transmitter may transmit a stream of the reference image and the stream of the additional image on which the channel multiplexing is performed.

Repeated descriptions with respect to FIG. 8 will be omitted for increased clarity and conciseness because the descriptions provided with reference to FIGS. 1 through 7 are also applicable to FIG. 8.

FIGS. 9 to 12 are flowcharts illustrating a 3D image generation method of a broadcasting receiver according to an example embodiment.

Referring to FIGS. 9 to 12, the 3D image generation method may be performed through operations 902 to 1206 by the broadcasting receiver 110 based on a stream of a reference image and a stream of an additional image in response to a reception.

Operations 902 to 1006 may be performed on the stream of the reference image.

In operation 902, the processor 320 may acquire a PAT included in the stream of the reference image by using a PSI parser. A receiver may acquire a PMT_ID by parsing the PAT.

In operation 904, the processor 320 may acquire a table having PID=PMT_PID by using the PSI parser. By parsing a PMT, the processor 320 may acquire information on a type of a broadcasting service provided by stereoscopic_program_info_descriptor( ) and stereoscopic_video_info_descriptor( ). By parsing the PMT, the processor 320 may also acquire a PID 906 of tables loading synchronization information, for example, 0x05-referenced_media_information( ) and 0x06-media_pairing_information( ).

Figure 10:
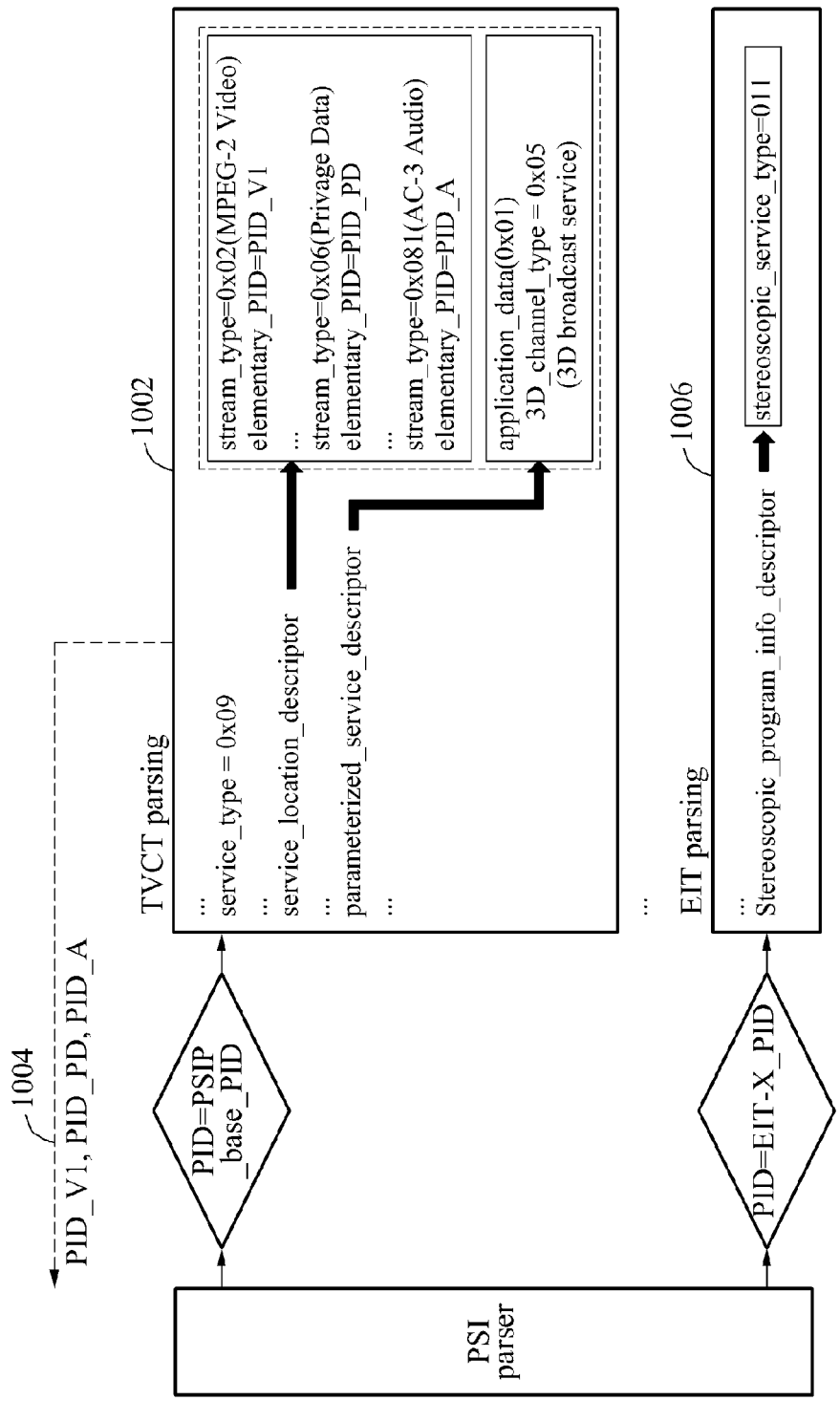
Figure 11:
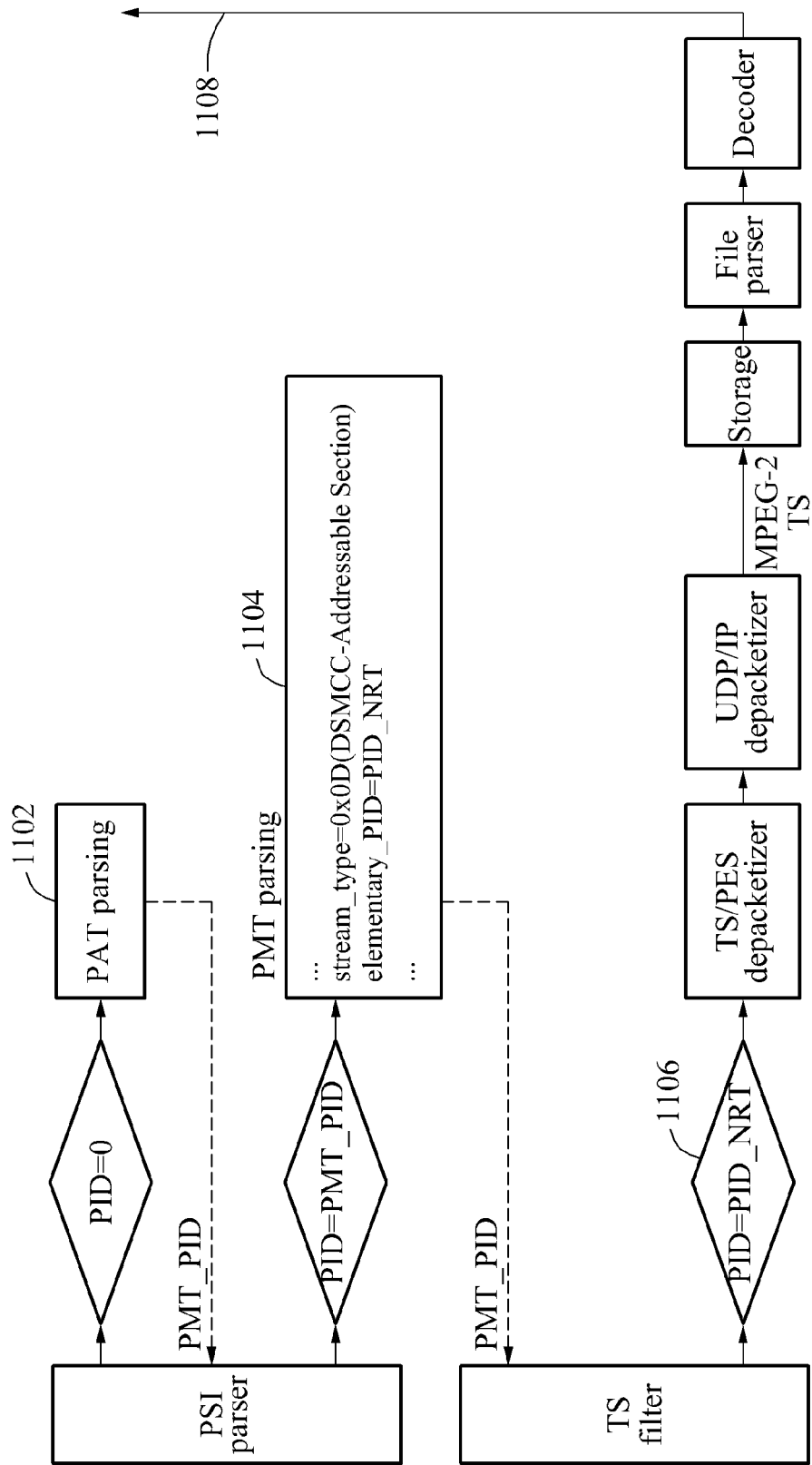

Referring to FIG. 10, the processor 320 may acquire a TVCT and an EIT by using a PSIP parser.

In operation 1002, the processor 320 may identify a broadcasting type of a reference stream by parsing the TVCT. For example, when 3D_channel_type=0x05, the reference stream may provide a 3D broadcast.

The processor 320 may provide service_location_descriptor and a PSD by parsing the TVCT.

A PID 1004 may be acquired from the service_location_descriptor.

In operation 1014, the processor 320 may acquire stereoscopic_program_info_descriptor by parsing an EIT.

Operations 1102 to 1108 described below may be performed on a stream of an additional image.

In operations 1102 and 1104, the processor 320 may parse and analyze a PAT and a PMT to acquire information on the stream of the additional image.

In operation 1106, the processor 320 may decode the stream of the additional image. For example, the stream of the additional image may be decoded using an advanced video coding (AVC) decoder.

In operation 1108, the processor 320 may provide the additional image to a 3D image generator, for example, a formatter.

Figure 12:
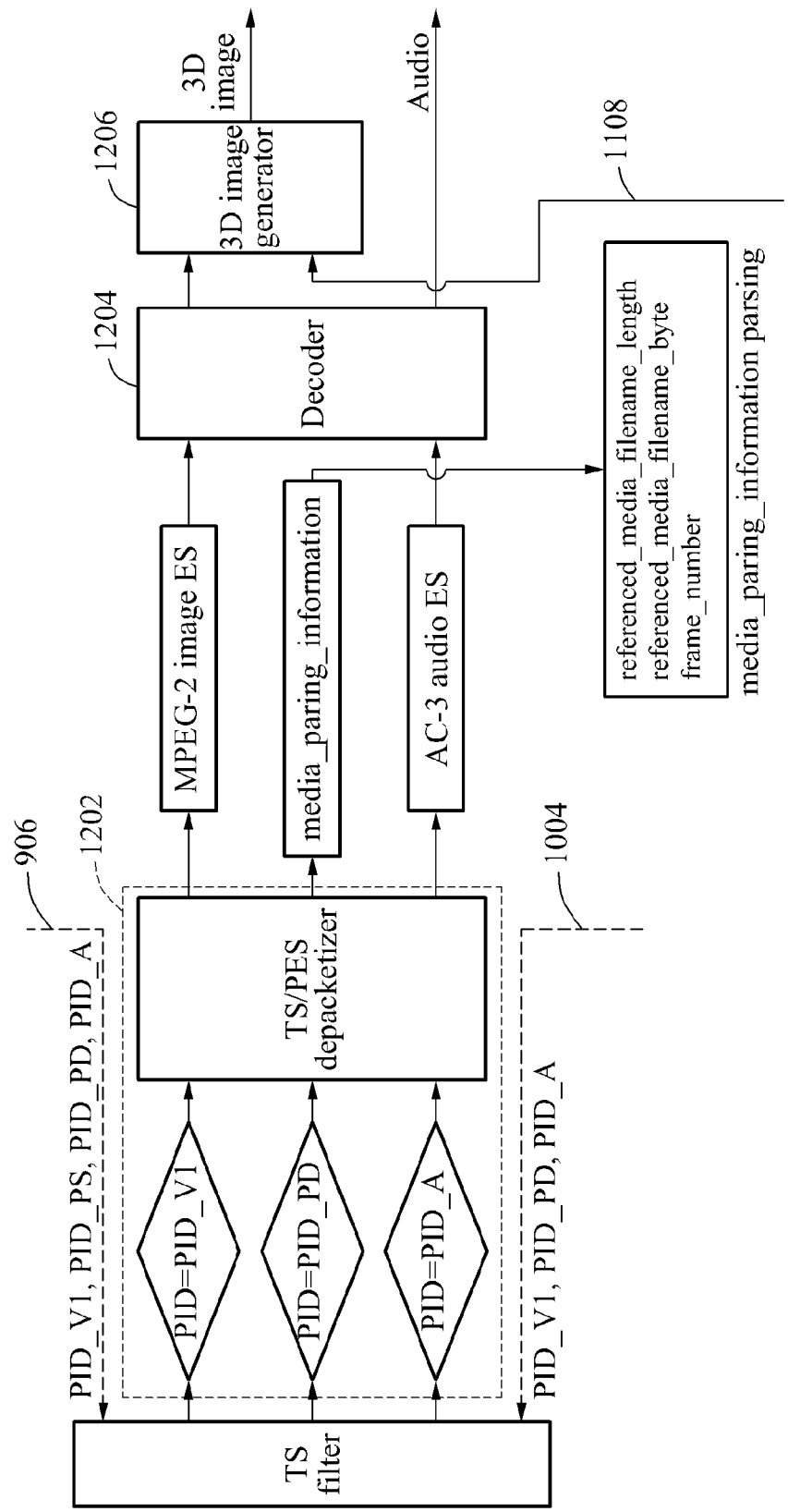

Referring to FIG. 12, a TS filter of the processor 320 may receive the PID 906 and the PID 1004.

In operation 1202, the processor 320 may process each PID using the TS filter. The processor 320 may filter a TS based on PID=PID_PD to acquire synchronization information. The processor 320 may filter the TS based on PID=PID_A to acquire audio information.

In operation 1204, the processor 320 may decode a reference image using a decoder.

In operation 1206, the processor 320 may generate a 3D image using a 3D image generator based on the decoded reference image and the decoded additional image.

Repeated descriptions with respect to FIG. 12 will be omitted for increased clarity and conciseness because the descriptions provided with reference to FIGS. 1 through 11 are also applicable to FIG. 12.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

DESCRIPTION OF THE REFERENCE NUMERALS

100: Broadcasting server
110: Broadcasting receiver
210: Communicator
220: Processor
230: Storage

The invention claimed is:

1. A broadcasting receiver comprising:
a communicator to receive a stream of an additional image of a three-dimensional (3D) broadcast in non-real time, and receive a stream of a reference image of the 3D broadcast in real-time; and
a processor to generate a 3D image of the 3D broadcast based on the stream of the additional image and the stream of the reference image,
wherein the additional image is allowed to be output independently of the reference image, and
wherein whether the additional image is allowed to be output independently of the reference image is indicated in a capabilities descriptor included in the stream of the additional image.

2. The receiver of claim 1, wherein the communicator receives the stream of the additional image in advance of receiving the stream of the reference image.

3. The receiver of claim 1, wherein a different terrestrial channel is assigned to each of the stream of the additional image and the stream of the reference image such that the additional image is allowed to be output independently of the reference image.

4. The receiver of claim 1, further comprising: a storage to store the stream of the additional image.

5. The receiver of claim 1, wherein the stream of the reference image comprises metadata for generating the 3D image.

6. The receiver of claim 5, wherein the metadata comprises synchronization information for synchronizing the reference image and the additional image.

7. The receiver of claim 1, wherein the processor acquires information on contents provided in non-real-time by parsing a stream of the real-time broadcasting, and the communicator requests the stream of the additional image based on the information.

8. The receiver of claim 7, wherein the information is comprised in the stream of the real-time broadcasting.

9. A broadcasting server comprising:
a communicator to transmit a stream of an additional image of a three-dimensional (3D) broadcast to a receiver in non-real-time, and transmit a stream of a reference image of the 3D broadcast to the receiver in real-time; and
a processor to assign a different terrestrial channel to each of the stream of the additional image and the stream of the reference image,
wherein, in response to the assigning, the additional image is allowed to be output independently of the reference image from the receiver, and
wherein whether the additional image is allowed to be output independently of the reference image is indicated in a capabilities descriptor included in the stream of the additional image.

10. The server of claim 9, wherein the communicator transmits the stream of the additional image in advance of transmitting the stream of the reference image.

11. The server of claim 9, wherein the stream of the reference image comprises metadata for generating the 3D image.

12. The server of claim 11, wherein the metadata comprises information for synchronizing the reference image and the additional image.

13. The server of claim 9, wherein the communicator transmits information on contents provided in non-real-time, to the receiver based on a stream of the real-time broadcasting, and receives a request for the stream of the additional image based on the information, from the receiver.

14. The server of claim 13, wherein the information is comprised in the stream of the real-time broadcasting.

15. The server of claim 9, wherein the processor performs signaling on each of the stream of the additional image and the stream of the reference image based on a program map table (PMT) to assign the different terrestrial channel to each of the stream of the additional image and the stream of the reference image.

16. The server of claim 9, wherein the processor assigns two terrestrial channels to the stream of the reference image, and terrestrial channels are a terrestrial channel applying the reference image to a two-dimensional (2D) broadcast and a terrestrial channel applying the reference image to the 3D broadcast.

17. The server of claim 16, wherein the processor performs signaling on the stream of the reference image based on a PMT corresponding to each of the terrestrial channels to assign the terrestrial channels to the stream of the reference image.

18. A broadcasting reception method comprising:
receiving a stream of an additional image of a three-dimensional (3D) broadcast in non-real-time;
receiving a stream of a reference image of the 3D broadcast in real-time; and
generating a 3D image of the 3D broadcast using the stream of the additional image and the stream of the reference image,
wherein the additional image is allowed to be output independently of the reference image, and
wherein whether the additional image is allowed to be output independently of the reference image is indicated in a capabilities descriptor included in the stream of the additional image.

* * * * *